United States Patent

[11] 3,552,504

| [72] | Inventor | Louis Laurent Chappuis<br>Lyon, France |
|---|---|---|
| [21] | Appl. No. | 810,182 |
| [22] | Filed | Mar. 25, 1969 |
| [45] | Patented | Jan. 5, 1971 |
| [73] | Assignee | Societe D Etude Et De Construction De Machines Pour Toutes Industries Secoma |
| [32] | Priority | Mar. 29, 1968 |
| [33] | | France |
| [31] | | No. 49,843 |

[54] DRILL SLIDE
10 Claims, 11 Drawing Figs.

[52] U.S. Cl. .................................................. 175/52,
173/141, 175/85
[51] Int. Cl. ................................................. E21b 19/14,
F21b 19/00
[50] Field of Search .......................................... 175/52, 85

[56] References Cited
UNITED STATES PATENTS

| 2,781,185 | 2/1957 | Robbins | 175/52 |
| 2,849,212 | 8/1958 | Robbins | 175/85 |
| 3,157,286 | 11/1964 | Gyongyosi | 175/52 |
| 3,336,991 | 8/1967 | Klem et al. | 175/85 |

*Primary Examiner*—James A. Leppink
*Attorney*—Waters, Roditi, Schwartz & Nissen

ABSTRACT: A drill slide supports at the center of its slide beam a rotary drive head having a motor, a drive chuck for a drive rod, and reducing gears. A translating carriage slides on the beam between the rear end of the beam and the rotary drive head and supports a thrust-bearing on the rear end of the drive rod. The carriage is moved by a double-acting hydraulic or pneumatic jack fixed to the beam. At the front of the beam is fixed a guide head and between the guide head and the rotary drive head the beam supports a rotatable barrel housing a drill and several drill extension shafts. The drive rod, the extension shafts and the drill have complementary threads and tappings at their couplable ends. Clamps are fixed on the barrel flanges to hold the drill or extension pieces for screwing and unscrewing. The drive rod and extension piece rear end are noncircular over the length of a threading. A free rotatory ring on the rear flange of the barrel is of suitable width to coordinate the coupling. A jack acting on a cam rotates the barrel to fixed angular positions to align the drill or extension shafts with the drive rod and a spring-retracted finger is displaced by hydraulic means into a detent to lock the angular position.

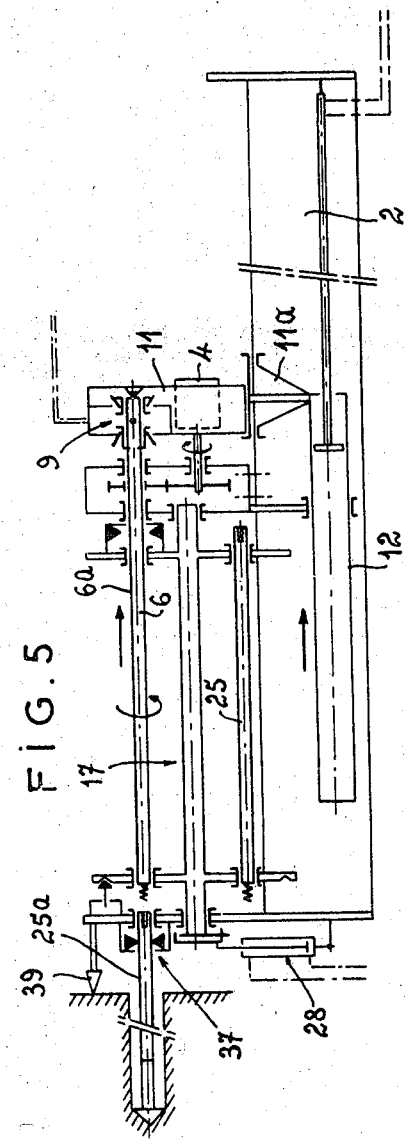
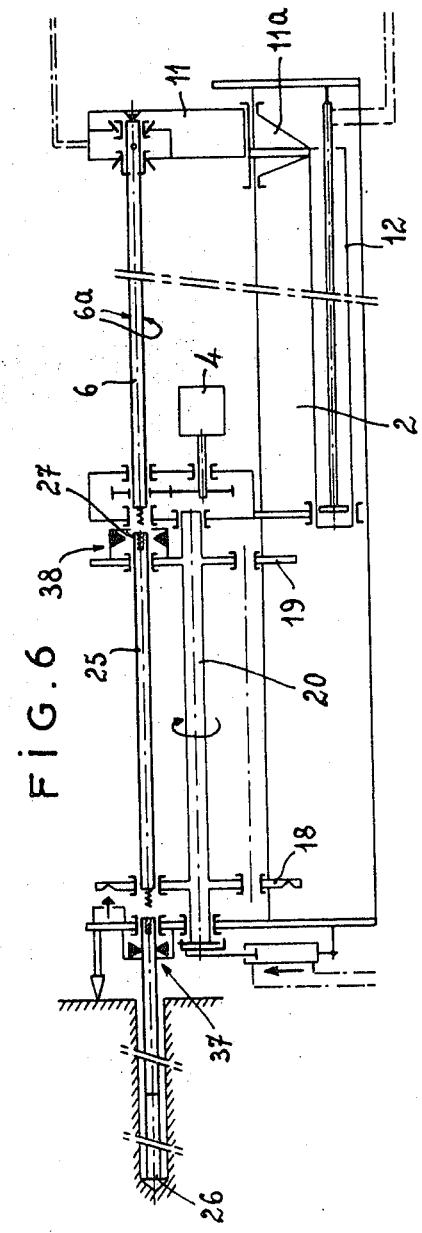

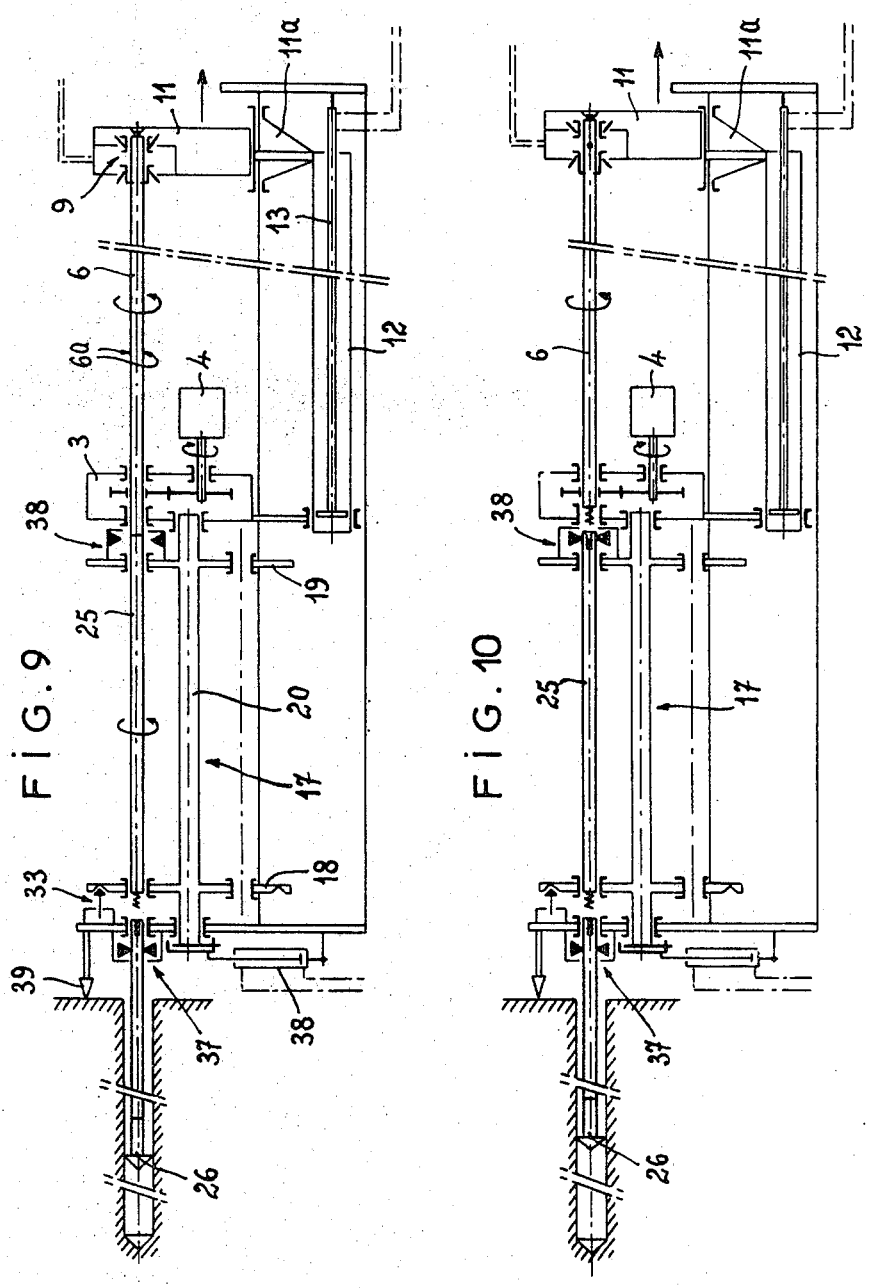

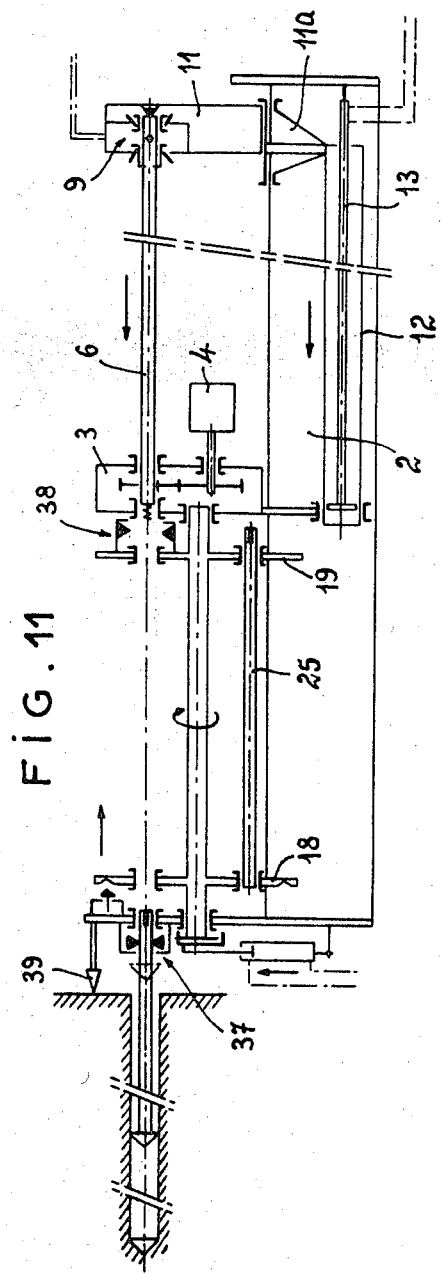

DRILL SLIDE

The present invention relates to a drill slide.

In the drilling of a tunnel, progress is considerably slowed by changes in direction which the tunnel must include.

In fact, on each change in direction, the space available in front of the drilling face is limited by the width of the tunnel, which necessitates the use of drills with extension pieces of which the mounting and dismounting enormously delay the drilling proper.

It is an object of the present invention to remedy this drawback by enabling the positioning and withdrawal of drill extension pieces not only very rapidly but capable, in addition, of being performed in a fully automatic manner.

To this end the invention provides a drill slide characterized in that it is constituted by a slide beam supporting: a rotary drive head fixed at substantially the center of the slide and comprising an electric, hydraulic, pneumatic or other motor; a drive chuck, for the drive rod and a set of reduction gears; a translation carriage comprising a thrust-bearing supporting the rear end of the drive rod and mounted to slide on the beam between the rear end of the latter and the rotary drive head, which carriage is axially connected to the cylinder of a double-acting hydraulic or pneumatic jack, of which the rod is coupled to the rear end of the slide beam; a guide head fixed to the front end of the slide beam; and, between the said guide head and the rotary drive head, a barrel with several housings of which one contains the drill and the other drill extension pieces, which barrel is driven in rotation by successive fractions of a turn in order to bring the aforesaid housings successively into the drilling axis, that is to say into the axial extension of the drive rod, the front ends of the drive rod and rear of the drill being respectively threaded and tapped or conversely and the corresponding ends of each extension piece being provided with complementary threadings and tappings, means being provided for immobilizing in rotation successively the extension piece and the drill on screwing and conversely the drill and the extension piece on unscrewing.

In one embodiment of the invention the means for locking the drill and the extension pieces on their screwing and on their unscrewing are constituted by a front clamp and rear clamps comprising each two V-shaped jaws of which one is movable in the direction of the other or conversely, under the action of a hydraulic or pneumatic jack, the front clamp being fixed on the guide head and the rear clamps being fixed on one of the flanges of the barrel, each in concordance with one of the housings provided in this latter, with their jaws situated on both sides of the guide orifice of the drill or of the corresponding extension piece.

On dismounting, it is necessary to unscrew the extension pieces by their front end, and consequently, their rear end must be connected in rotation to the drive rod. For this purpose, over a length corresponding at least to that of one of its threadings the rear end of each extension piece is of the same cross section as the drive rod, that is to say of noncircular section, and the rear flange of the barrel bears a ring free in rotation of which the bore has, itself also, the same section as the drive rod, the position of the end of the stroke of the jack, for maneuvering the carriage, corresponding to the withdrawal position of this latter being such that the rear end of the extension piece and the front end of the drive rod are both located inside the aforesaid ring, the length and the angular position of the threadings assuring the connection between the drive rod and each of the extension pieces being such that at the end of screwing, the identical sections of the drive rod of the rear end of the extension piece considered are in perfect concordance, and the length of this ring being such that after unscrewing from the front end of the extension piece, the front end of the drive rod is outside its bore.

By then locking the extension piece with the rear clamp, it is therefore made possible to unscrew it from the drive rod. The unscrewing of the drive rod and of the extension pieces is necessarily accompanied by an axial displacement towards the rear. Now, during this unscrewing the maneuver jack of the carriage has not been supplied with fluid under pressure. To avoid the necessity of such a supply, according to the invention, the movable carriage is mounted freely in translation on a cradle connected in translation to the rear part of the cylinder of the jack, between two stops bounding a stroke equal at least to twice the length of a threading of the end of the drive rod or of an extension piece.

In a preferred embodiment of the invention, the barrel is driven in fractional rotation by means of a double-acting, hydraulic, pneumatic or other jack, fixed externally to the guide head and of which the rod acts on a drive cam of the said barrel by making it undergo an angular displacement determined as a function of the number of extension pieces. To immobilize the barrel in each of its positions, there is provided, on one hand, in the guide head, a retractable finger, and on the other hand, in the front flange of the barrel a certain number of housings, spring means holding this finger normally in retracted position, whilst hydraulic and pneumatic means are provided for displacing it at the opportune time, into one of the aforesaid housings in order to ensure the locking of the barrel.

In order that the invention may be more fully understood, one embodiment of the drill slide, according to the invention, is described below purely by way of illustrative but nonlimiting example, with reference to the accompanying drawing, in which:

FIGS. 4 to 11 are diagrammatic views in side elevation illustrating the various operational phases of this embodiment.

Figure 1:
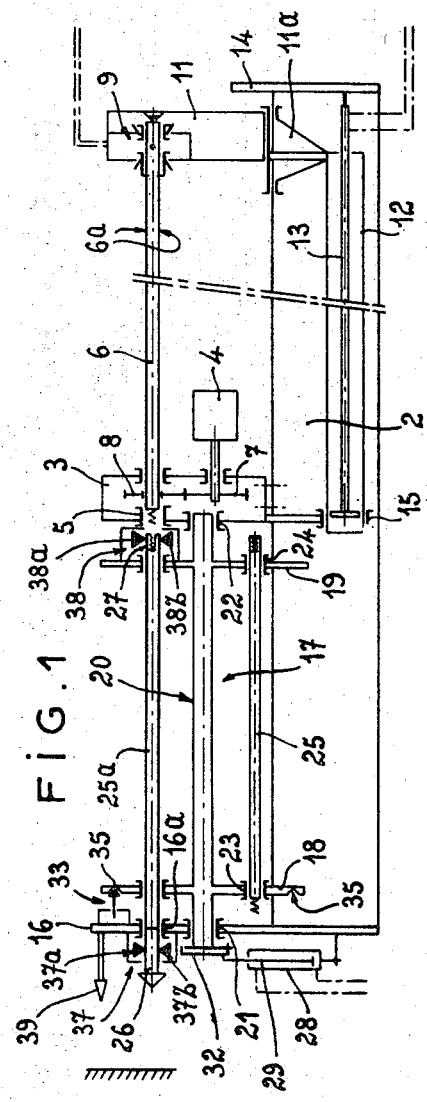
FIG. 1 is a diagrammatic view in side elevation of the said embodiment.

The drill slide shown in the drawing is constituted by a slide beam 2, formed from two U-shaped profiles 2a and 2b arranged face to face and slightly separated from one another. This beam 2 supports substantially at its center, a rotary drive head 3. This head 3 comprises, in its lower part, a hydraulic motor 4 and in its upper part a chuck 5 enabling at the same time the driving in rotation and sliding of a drive rod 5. This chuck 5 is connected to the motor 4 through a set of two gears, one 7 driven directly by the motor 4, the other 8 keyed on the chuck 5, and which transmits to it its rotary movement.

To couple in rotation the drive rod 6 and the chuck 5, two half-flats 6a are provided diametrically opposite over the whole length of the drive rod 6 and of the chuck 5.

The rear end of this drive rod 6 is mounted in a thrust-bearing 9 borne by a translation carriage 11 mounted to slide, on the upper wings of the beam 2 between the rear end of the latter and the rotary drive head 3. This carriage 11 is movable along the slide beam 2 and borne by a cradle 11a connected axially to the cylinder 12 of a hydraulic, pneumatic or other double-acting horizontal jack, of which the stem 13 is attached to a plate 14 ensuring the connection of the rear ends of two sections 2a and 2b constituting the slide beam 2. The carriage 11 can itself slide freely from one end to the other of its cradle 11a. This jack cylinder 12 is guided at the front by a fixed bearing 15 rigidly attached to the lower part of the drive head 3. The two feeds of this jack are effected through the stem 13.

The front end of the beam 2 comprises a guide head 16 comprising a bearing 16a arranged coaxially to the drive rod 6.

Between this guide head 16 and the rotary drive head 3 is placed a barrel 17 comprising two vertical flanges 18 and 19 connected through a spacing tube 20. This barrel is supported, at its two ends, by ball bearings 21 and 22 located, respectively, in the guide head 16 and in the drive head 3.

These flanges 18 and 19 each comprise four bearings respectively 23 and 24 arranged on a same concentric circle with the spacing member 20 and displaced by 90° with respect to one another. The bearings 23 are rigidly attached to the flange 18 whilst the bearings 24 comprising the same half-flats as the chuck 5, are each mounted to turn, inside brass rings 24a borne by the flange 19. In these bearings 23 and 24 are located four extension pieces 25 of which a longer one 25a bears the drill 26.

The rear ends of the drill 26 and the front of the drive rod 6 bear respectively a tapping and a threading. In addition, each extension piece 25 comprises, at its front end, a threading and at its rear end, a tapping.

Figure 2:
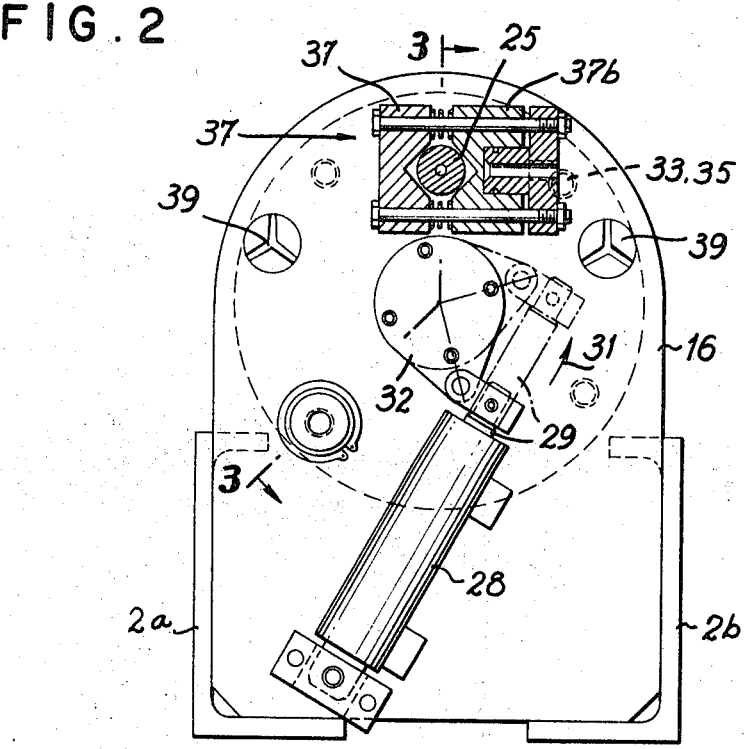
FIG. 2 is a front view of the guide head of the embodiment of FIG. 1.
Figure 3:
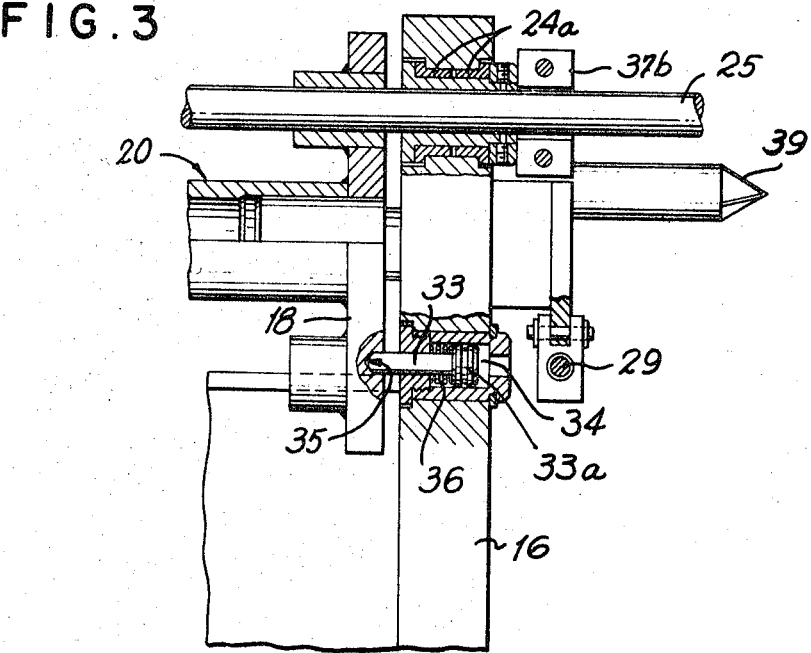
FIG. 3 is a sectional view along the line 3–3 of FIG. 2.

Moreover, on each of the rear ends of these extension pieces 25 are arranged two half flats 27 identical with those of the drive rod 6 and intended to couple in rotation each of the extension pieces 25 to the bearing 24 which corresponds to it when it is in withdrawal or starting position. The barrel 17 is driven in fractional rotation by quarter turns in this example, by means of a double-acting jack 28, fixed externally in the lower part of the guide head 16 and of which stem 29 acts in the direction of the arrow 31 on a drive cam 32 of the barrel and subjects it to an angular displacement of 90° such as is shown in mixed interrupted lines in FIG. 2. This part rotation has the effect of bringing each extension piece 25 successively into the drilling axis, that is to say into the axial extension of the drive rod 6.

To immobilize the barrel when an extension piece 25 is brought into the axis of the drive rod 6, there is provided on one hand, in the guide head 16 a retractable finger 33 of which the retracted end forms a piston 33a axially movable inside a chamber 34 arranged in the said head 16 and on the other hand, in the flange 18, four housings 35 displaced by 90° with respect to one another and each corresponding to one of the four positions of the barrel 17. This finger 33 is brought and maintained in position in its housing 35 by means of compressed air acting on the rear face of its piston 33a.

A return spring 36 compressed between the front end of the chamber 34 and the front face of the piston 33a enables automatic retraction of the finger 33 when the inlet for compressed air is closed. The guide head 16 bears, on its front face, a front clamp 37 of which the jaws 37a and 37b of V-shaped profile are situated on both sides of the axis of the bearing 16a.

From its side, the rear flange 19 of the barrel 17 bears in correspondence with each housing of the barrel 17, a rear clamp 38 of which the jaws of V-shaped profile 38a and 38b are located on both sides of the axis of the said housing.

One of the jaws 37a or 37b on one hand and 38a or 38b, on the other hand, may be displaced in the direction of the other or inversely, under the action of a fluid under pressure, so as to clamp and lock the drill or the extension piece of which a part is situated between it and the fixed jaw and which is associated with it.

Finally, two anchoring points 39 are fixed perpendicularly to the said guide head 16 and in its upper part to ensure to the slide 2 a correct and stable positioning throughout the length of drilling.

The operation of this drill slide, from its starting position, as shown in FIG. 1 is analyzed as follows:

The barrel 17 having been locked by means of the finger 33, the first extension piece, or drill carrier extension piece 25a, is engaged both in the guide head 16 and in the barrel 17. The cradle 11a being in rear position on the beam 2 and the carriage 11 being in rear position in its cradle 11a a, the extension piece 25a is screwed on the front end of the drive rod 6. For this purpose, on the one hand, it is locked by the front clamp 37 and, on the other hand, the motor 4 is put into operation and the jack 12 is fed from the side of its front chamber.

Figure 4:
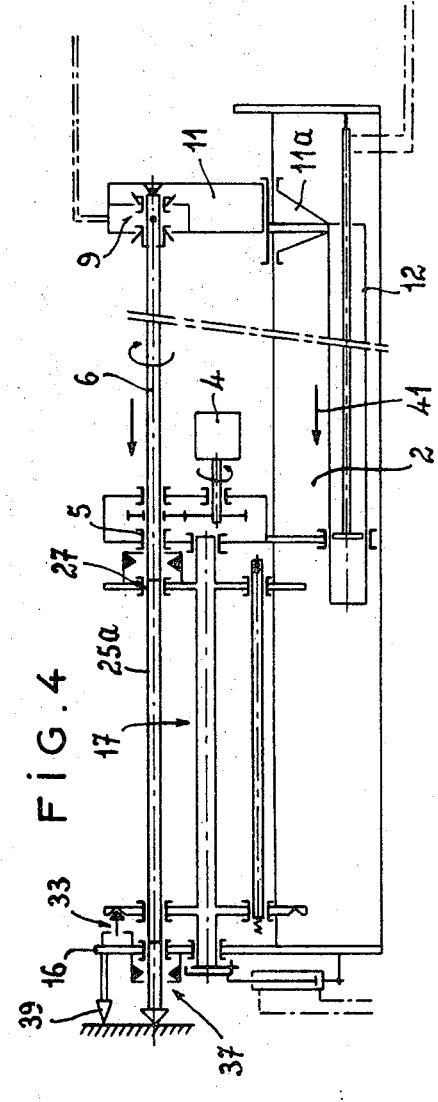

The drill slide 2 is then brought with its anchoring point 39 in abutment against the drill face, as illustrated in FIG. 4, by axial displacement of the beam 2 on its support. The drill 25a rotated by the chuck 5 and thrust by the thrust-bearing 9 then penetrates into the cutting face. In fact the cylinder 12 of the hydraulic jack is displaced in the direction of the arrow 41 driving the cradle 11a and the carriage 11. At the end of the front stroke of the carriage 11, the motor 4 is stopped. The rear end of the extension piece 25a is immobilized in rotation by means of the front clamp 37 whilst the rear chamber of the jack 12 is briefly fed to obtain its withdrawal in the reverse direction of the arrow 41 over a path corresponding substantially with the path of the carriage 11 in its cradle 11a. The carriage 11 is then at the front end of its course on the cradle 11a as shown in FIG. 5.

The motor 4 is then placed in operation in reverse direction which actuates the unscrewing of the drive rod out of the immobilized extension piece 25a, in the course of which unscrewing the carriage 11 pushed back by the drive rod 6 withdraws slowly over its cradle 11a.

Figures 7, 8:
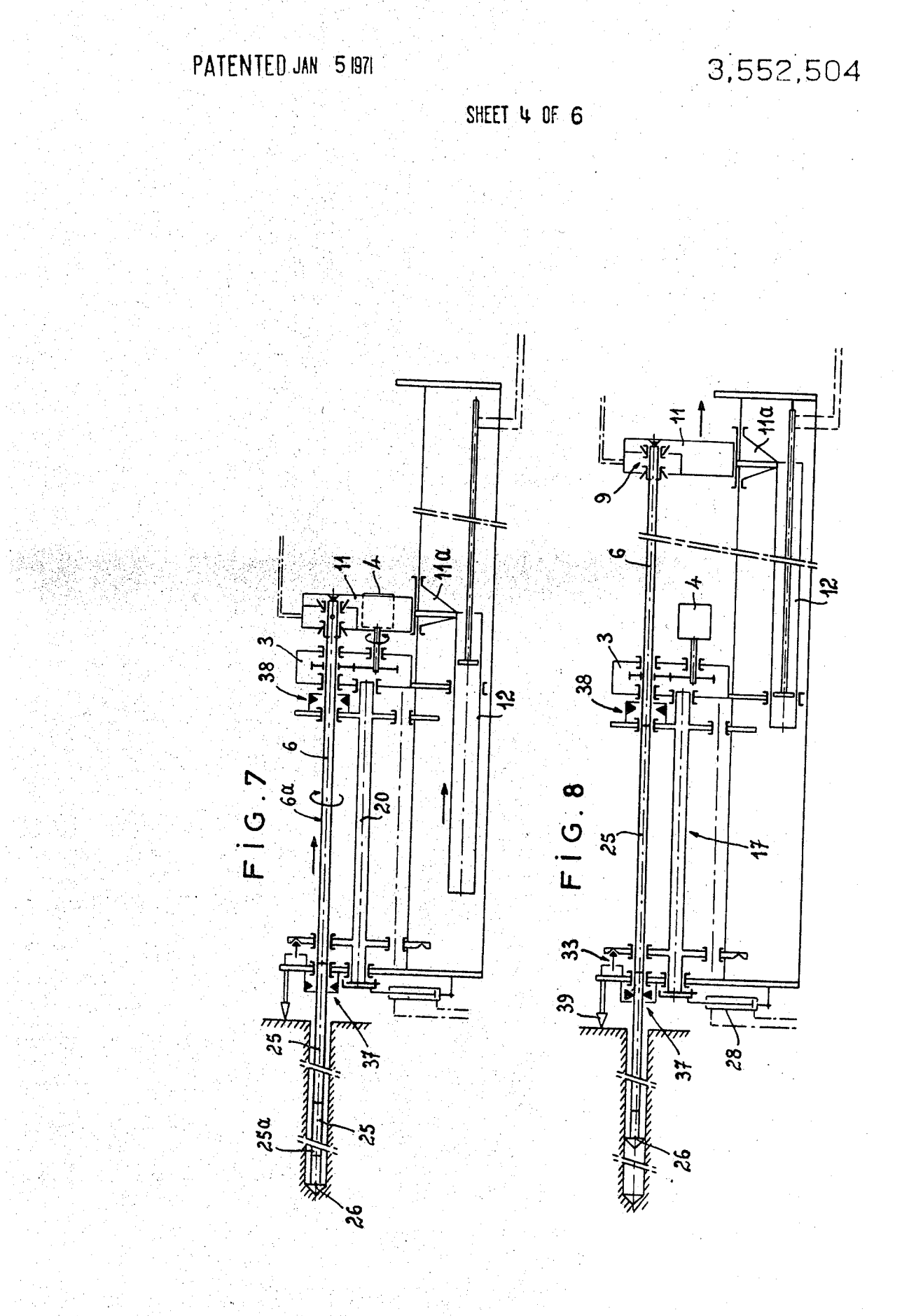

Once the bar 6 is uncoupled from the extension piece 25a, the carriage 11 is brought back by the jack 12 into withdrawal position. The operator then causes the barrel 17 to turn through a quarter turn, by acting on the jack 28, thus bringing the second extension piece 25 into the common axis of the drive rod 6 and of the first extension piece 25a as illustrated in FIG. 6. The front clamp 37 remaining clamped, and the rear clamp 38 being clamped in its turn, the motor 4 is put into operation in the normal direction of drilling, and the jack 12 is fed from the side of its front chamber to cause the advance of the cradle 11a then that of the carriage 11. In the course of a first time, the drive rod 6 is screwed on the second extension piece 25 then, in the course of a second time after unscrewing from the rear clamp 38, the second extension piece 25 is screwed on the first extension piece 25a. After the unscrewing from the front clamp 37, the drilling may be pursued. The same operations are repeated for the positioning of the third and fourth extension pieces 25. The four extension pieces having been positioned, a drilling corresponding to four times the length of the extension pieces 25 is thus realized. At the end of drilling, the carriage 11 occurs then in front abutment against the drive head 3 and the fourth extension piece 25 is engaged in the drilled hole. The carriage 11 is brought back rapidly to the rear by the thrust applied to it by the front end of its cradle 11a as illustrated by FIG. 7, the whole bar 6 and extension pieces 25 being driven in rotation in the normal direction of drilling when the jack 12 arrives at the end of the back stroke; the front ends of the extension piece 25 and the front of the drive rod 6 are located inside the special ring 24 borne by the flange 19 of the barrel 17, as illustrated in FIG. 8. The extension piece 25 considered and the drive rod 6 are hence coupled in rotation to one another. The fourth extension piece 25 has also completely emerged from the drilled hole as illustrated in FIG. 8. The third extension piece 25 is then immobilized in rotation by the front clamp 37 and the motor 4 is actuated in reverse rotation from the normal direction of drilling.

Consequently, the fourth extension 5 is unscrewed from the third and slides at the same time into the barrel 17 by the length of its threading. This withdrawal is in addition transmitted to the drive rod 6 and to the carriage 11 which slides in its cradle 11a. The fourth extension piece 25 unscrews automatically by its front end since it is coupled in rotation through the ring 24, to the drive rod 6. In addition the extension piece 25 and the drive rod 6 cannot be unscrewed from one another as long as the rear of the extension piece is engaged in the special ring 24. When the extension piece 25 is completely unscrewed from the preceding one, the carriage 11 is displaced on its cradle 11a by a length equal to the length of threading namely about 40 mm. This displacement then enables the rear ends of the extension piece 25 and the front of the drive rod 6 to emerge from the ring 24 as illustrated by FIG. 9. The extension piece 25 is then immobilized in rotation by the rear clamp 38, which causes its unscrewing from the drive rod 6, always driven in rotation. In the course of this second unscrewing, the drive rod 6 is displaced again on the rear driving the carriage 11 with it, as illustrated in FIG. 10. It is hence seen that the free path of the carriage 11 over its cradle 11a must necessarily by equal to at least twice the length of threading of the end of the drive rod 6 or of an extension piece 25.

The rear clamp 38 is then unscrewed and the barrel 17 pivoted by a quarter turn to present, at the rear of the third extension piece 25, the housing which is intended for it as illustrated in FIG. 11.

To withdraw the third extension piece 25, the carriage 11 is advanced with normal rotation of the drive rod 6, which comes to be screwed on the third extension piece 25. The front clamp 37 is then unscrewed and the carriage 11 brought to the back rapidly with rotation of the rod 6 in the normal direction of drilling.

It then suffices to proceed in the same manner as for the uncoupling of the fourth extension piece 25.

It is the same for the second and the first. Thus when the carriage 11 finds itself again in rear position with the first extension piece 25a in the barrel 17, the starting conditions are restored for boring the following hole.

As goes without saying, the invention is not limited to the single embodiment of this drill slide, which has been described above, by way of nonlimiting example; it embraces, on the contrary, all variations of realization. Thus, for example, the movable carriage could be directly connected to the jack, means being provided to free the jack from all pressure in the zone of unscrewing the extension pieces, with respect to the drive rod.

Moreover, the jack could be of the double-rod type whose ends would be fixed to the slide, thus ensuring a better guiding of its movable body.

Other changes and modifications are also to be regarded as within the scope of the invention as defined by the appended claims.

I claim:

1. A drill slide comprising: a slide beam supporting: a rotary drive head fixed substantially at the center of the slide and comprising a motor, a drive chuck for a drive rod and a set of reducing gears, a translating carriage comprising a thrust-bearing in support on the rear end of the drive rod and mounted sliding on the beam between the rear end of the beam and said rotary drive head, said carriage being axially connected to the cylinder of a double-acting first jack of which the rod is coupked to the qe[r end of the slide beam, a guide head fiwed at the front end of the slide beam, and between the said guide head and the rotary drive head, a barrel having a front and rear flange and several housings of which one contains the drill and the others the drill extension pieces, said barrel being equipped with rotary drive means to drive it through fractions of a turn into predetermined angular positions in order to bring said housing successively into a drilling axis, which is the axial extension of the drive rod, the front ends of the drive rod and the rear of the drill having screw means and the corresponding ends of each extension piece being provided with complementary screw means, and rotation-immobilizing means for successively immobilizing the extension piece and the drill on screwing and inversely the drill and the extension piece on unscrewing.

2. A drill slide according to claim 1, wherein said rotation-immobilizing means are constituted by a front clamp and rear clamps each comprising two V-shaped jaws adapted for approach and separating movement under the action of a second jack, said front clamp being fixed on the guide head and the rear clamps being fixed on one of the flanges of said barrel, each clamp being located in correspondence with one of the housings provided in the barrel with their jaws situated on both sides of a guide orifice for the drill or the corresponding extension piece.

3. A drill slide according to claim 1, wherein over a length corresponding at least to that of one of its threadings, the rear end of each extension piece is of the same cross section as the drive rod, and the rear flange of the barrel bears a ring free in rotation of which the bore has also the same cross section as the drive rod, the stroke-end position of said carriage-manipulating jack corresponding to the withdrawal position of the carriage being such that the rear end of the extension piece and the front end of the drive rod are both located inside the said ring, the length and the angular position of the screw means ensuring the coupling between the the drive rod and each of the extension pieces being such that at the end of screwing, the identical sections of the drive rod and of the rear end of the extension piece considered are in complete concordance, and the length of said ring being such that after unscrewing from the front end of the extension piece, the front end of the drive rod is outside the bore of said ring.

4. A drill slide according to claim 1 including a cradle connected in translation to the rear part of the cylinder of said first jack, said carriage being mounted free in translation on said cradle, two stops being provided to bound the path of the carriage to be equal at least to twice the length of said screw means.

5. A drill slide according to claim 1, wherein said rotary drive means is a double-acting jack fixed externally to the guide head, and a drive cam on said barrel on which the rod of the jack forming the rotary drive means acts to subject it to an angular displacement, whose value is predetermined by the number of said extension pieces.

6. A drill slide according to claim 1, including means to immobilize the barrel in each of said angular positions, comprising, on one hand, in the guide head, a retractable finger and, on the other hand, in the front flange of the barrel, a plurality of housings for spring means holding said finger normally in retracted position, and displacing means for displacing the finger at opportune time, into one of said spring means housings, in order to ensure the locking of the barrel in a said angular position.

7. A drill slide according to claim 2, including a cradle connected in translation to the rear part of the cylinder of said first jack, said carriage being mounted free in translation on said cradle, two stops being provided to bound the path of the carriage to be equal at least to twice the length of said screw means.

8. A drill slide according to claim 3, including a cradle connected in translation to the rear part of the cylinder of said first jack, said carriage being mounted free in translation on said cradle, two stops being provided to bound the path of the carriage to be equal at least to twice the length of said screw means.

9. A drill slide a according to claim 3, including means to immobilize the barrel in each of said angular positions, comprising, on one hand, in the guide head, a retractable finger and, on the other hand, in the front flange of the barrel, a plurality of housings for spring means holding said finger normally in retracted position, and displacing means for displacing the finger at opportune time, into one of said spring means housings, in order to ensure the locking of the barrel in a said angular position.

10. A drill slide according to claim 5, including means to immobilize the barrel in each of said angular positions, comprising on one hand, in the guide head, a retractable finger and, on the other hand, in the front flange of the barrel, a plurality of housings for spring means holding said finger normally in retracted position, and displacing means for displacing the finger at opportune time, into one of said spring means housings, in order to ensure the locking of the barrel in a said angular position.